United States Patent
Ishii

(10) Patent No.: US 10,229,707 B2
(45) Date of Patent: Mar. 12, 2019

(54) MAGNETIC DISK RECORDING DEVICE HAVING DIFFERENT TIME INTERVAL BETWEEN FIRST AND SECOND PRE-HEATING PERIODS

(71) Applicant: KABUSHIKI KAISHA TOSHIBA, Tokyo (JP)

(72) Inventor: Koji Ishii, Fujisawa Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 0 days.

(21) Appl. No.: 15/694,844

(22) Filed: Sep. 3, 2017

(65) Prior Publication Data
US 2018/0286440 A1 Oct. 4, 2018

(30) Foreign Application Priority Data
Mar. 30, 2017 (JP) ................................. 2017-067314

(51) Int. Cl.
| | |
|---|---|
| *G11B 5/60* | (2006.01) |
| *G11B 21/08* | (2006.01) |
| *G11B 5/455* | (2006.01) |
| *G11B 5/55* | (2006.01) |
| *G11B 5/48* | (2006.01) |

(52) U.S. Cl.
CPC .............. *G11B 5/607* (2013.01); *G11B 5/455* (2013.01); *G11B 5/5547* (2013.01); *G11B 21/085* (2013.01); *G11B 5/48* (2013.01); *G11B 5/6076* (2013.01)

(58) Field of Classification Search
None
See application file for complete search history.

(56) References Cited

U.S. PATENT DOCUMENTS

| | | | |
|---|---|---|---|
| 6,975,472 B2 | 12/2005 | Stover et al. | |
| 7,088,545 B1 * | 8/2006 | Singh ................... | G11B 5/5547 360/75 |
| 7,330,323 B1 | 2/2008 | Singh et al. | |
| 7,430,090 B2 | 9/2008 | Oyamada et al. | |
| 8,456,980 B1 * | 6/2013 | Thayamballi .......... | G11B 5/607 360/59 |
| 8,576,509 B1 * | 11/2013 | Hogg ..................... | G11B 5/607 360/75 |
| 8,619,508 B1 * | 12/2013 | Krichevsky ............ | G11B 5/314 369/13.11 |
| 9,460,745 B1 * | 10/2016 | Flechsig ................ | G11B 5/607 |

(Continued)

Primary Examiner — Tan X Dinh
(74) Attorney, Agent, or Firm — Kim & Stewart LLP

(57) ABSTRACT

A disk device includes first and second recording surfaces, a first head for the first recording surface, including a first heater which generates heat via a first electric power, a second head for the second recording surface, including a second heater which generates heat via a second electric power, and a control circuit configured to execute a first preheating operation in which the first electric power is supplied to the first heater for a first time interval prior to starting a first writing process to write data on the first recording surface by the first head, and to execute a second preheating operation in which the second electric power is supplied to the second heater for a second time interval prior to starting a second writing process to write data on the second recording surface by the second head. The first time interval is different from the second time interval.

20 Claims, 7 Drawing Sheets

(56) References Cited

U.S. PATENT DOCUMENTS

| | | | | |
|---|---|---|---|---|
| 2006/0092550 A1* | 5/2006 | Ishii | .................... | G11B 5/6005 360/75 |
| 2007/0230014 A1* | 10/2007 | Yamashita | ........... | G11B 5/6005 360/75 |
| 2007/0230015 A1* | 10/2007 | Yamashita | ............. | G11B 5/455 360/75 |
| 2008/0068739 A1* | 3/2008 | Oyamada | ............. | G11B 5/6005 360/75 |
| 2008/0100950 A1* | 5/2008 | Mitsunaga | ........... | G11B 5/6005 360/75 |
| 2008/0170321 A1* | 7/2008 | Shimozato | ........... | G11B 5/6029 360/75 |
| 2009/0027800 A1* | 1/2009 | Iwamoto | ............. | G11B 5/6005 360/75 |
| 2014/0347965 A1* | 11/2014 | Ruan | ................... | G11B 5/6029 369/13.26 |

* cited by examiner

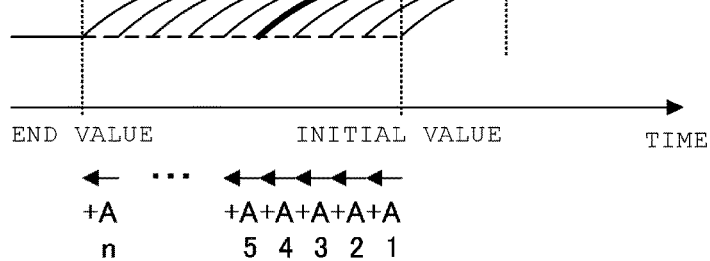
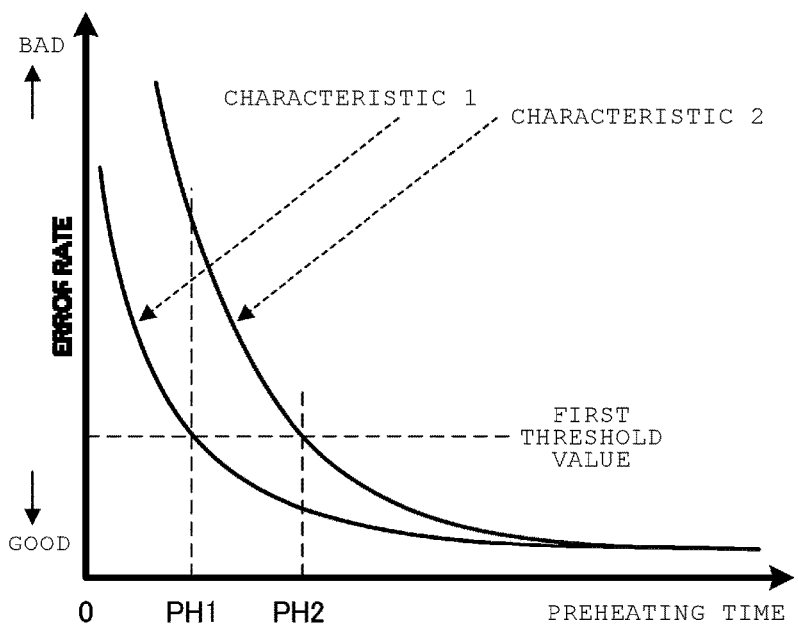

MAGNETIC DISK RECORDING DEVICE HAVING DIFFERENT TIME INTERVAL BETWEEN FIRST AND SECOND PRE-HEATING PERIODS

CROSS-REFERENCE TO RELATED APPLICATION

This application is based upon and claims the benefit of priority from Japanese Patent Application No. 2017-067314, filed Mar. 30, 2017, the entire contents of which are incorporated herein by reference.

FIELD

Embodiments described herein relate generally to a disk device and a control method capable of controlling a distance between a disk and a head.

BACKGROUND

Disk devices, such as hard disk drives (HDDs) generally include a magnetic disk as a recording medium and a slider facing the magnetic disk. In such a HDD, the slider includes at least a head portion having a reading head (or element) and a recording head (or element) and a heater element, and floats over the rotating magnetic disk. Regarding reading and writing of data on the magnetic disk, there are well-known techniques for improving magnetic characteristics between the head portion disposed in the slider and the magnetic disk. Specifically, there is a technique for controlling floating of the slider over the magnetic disk so as to shorten a distance between the head portion and the magnetic disk (i.e., to lower a fly height of the head portion with respect to the magnetic disk. This technique may also be referred to as dynamic fly height (DFH) control, or thermal fly height control (TFC) in some cases. In some cases, a preheating process is executed, in which the heater element is heated at a point in time prior to a point in time at which the head portion passes a target position for reading or writing in the floating control. Execution of the preheating processing enables a desired fly height of the head portion to be obtained at the point in time at which the head portion passes the target position.

DESCRIPTION OF THE DRAWINGS

FIGS. 4A-4C are diagrams illustrating operation of a part of the PH time adjustment determination process, according to the first embodiment.

FIG. 5 is a diagram illustrating a plurality of read results obtained via the WPH time adjustment determination process.

DETAILED DESCRIPTION

Embodiments provide a disk device and a control method capable of appropriately controlling floating of a slider over a magnetic disk.

In general, according to one embodiment, a disk device includes a first recording surface and a second recording surface, each disposed on any one of one or more disks, a first head for the first recording surface, the first head including a first heater which generates heat via a first electric power, a second head for the second recording surface, the second head including a second heater which generates heat via a second electric power, and a control circuit configured to execute a first preheating operation in which the first electric power is supplied to the first heater for a first time interval prior to starting a first writing process in which data are written on the first recording surface by the first head, and to execute a second preheating operation in which the second electric power is supplied to the second heater for a second time interval prior to starting a second writing process in which data are written on the second recording surface by the second head. The first time interval is different from the second time interval.

Hereinafter, embodiments will be described with reference to the drawings. Embodiments of the present disclosure are not limited to the drawings and related embodiments described below.

Figure 1:
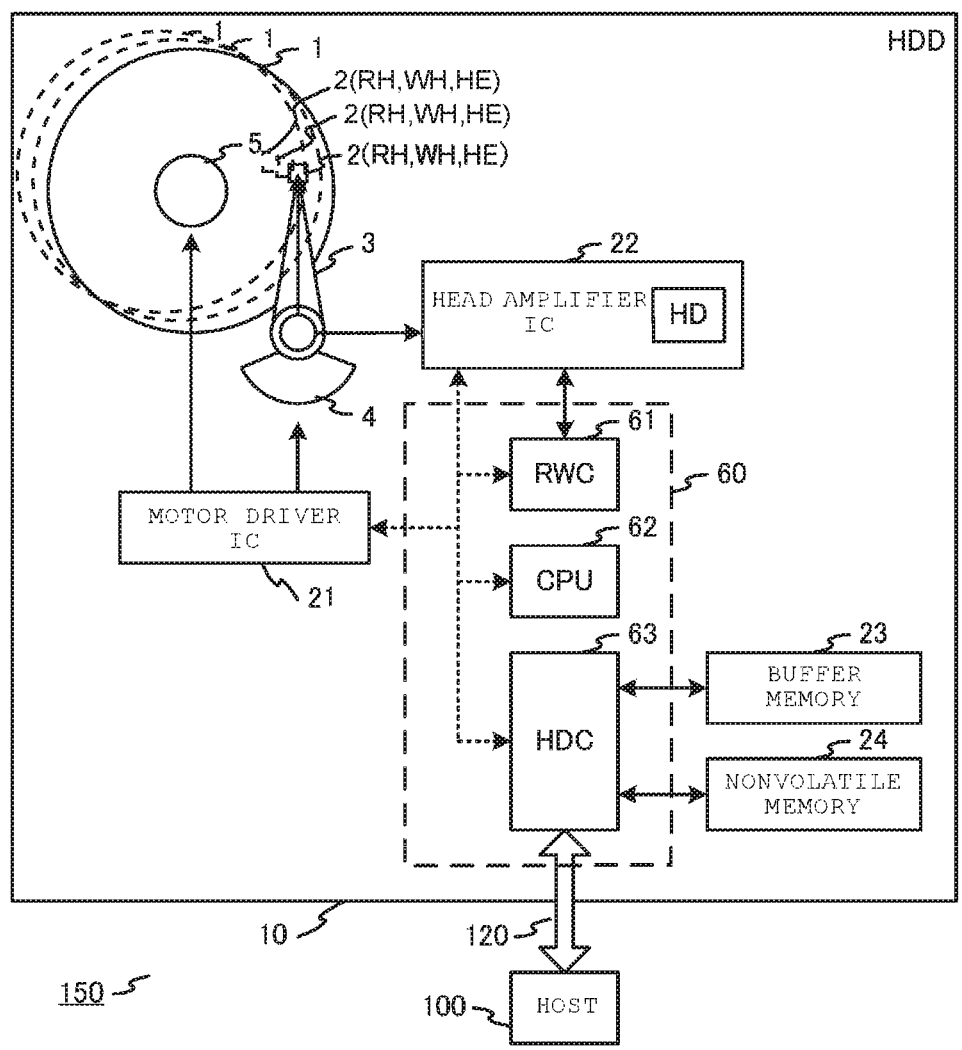
FIG. 1 is a block diagram illustrating a configuration of a system including a disk device according to an embodiment.

FIG. 1 is a block diagram illustrating a configuration of a system 150 including a disk device 10 according to an embodiment. In the present embodiment, as the disk device 10, a hard disk drive (hereinafter referred to as HDD) 10 is illustrated. The system 150 includes a host 100 and the HDD 10. A host interface (I/F) 120 connects the host 100 and the HDD 10, and is used for transmitting and receiving a command, user data, and a command response between the host 100 and the HDD 10, or reporting a status between the host 100 and the HDD 10. The host I/F 120 is configured based on, for example, the serial advanced technology attachment (SATA) standard and the serial attached SCSI (SAS) standard. The HDD 10 is connected to the host 100 via the host I/F 120, and functions as a data storage unit of the host 100. For example, the system 150 is a personal computer, a mobile device, or a server apparatus. For example, the host 100 is a chipset IC included in a personal computer or a mobile device, or a server controller included in a server apparatus.

The HDD 10 includes a head-disk assembly (HDA) including a magnetic disk 1, a slider 2, an arm 3, a voice coil motor (VCM) 4, and a spindle motor (SPM) 5. The HDA is disposed inside a housing (not illustrated) of the HDD 10. The slider 2 includes a head portion with a read head (RH) and a write head (WH), and a heater element (HE). In addition, the HDD 10 includes a circuit block including a motor driver IC (hereinafter referred to as a driver IC) 21, a head amplifier IC (hereinafter referred to as a head IC) 22, a buffer memory 23, a nonvolatile memory 24, and a controller 60. The controller 60 includes a read write channel (hereinafter, may also be referred to as an RWC) 61, a CPU (central processing unit) 62, and a hard disk controller (hereinafter referred to as an HDC) 63. The head amplifier IC 22 includes at least a heater driver (HD).

The HDD 10 according to the embodiment executes at least processing of write data on the magnetic disk 1 (referred to as write processing), processing of read data recorded on the magnetic disk 1 (referred to as read processing), and control of a fly height of a portion of the slider 2 (typically the head portion) with respect to the magnetic disk 1 (i.e., fly height control). The floating control may also be referred to as dynamic fly height (DFH) control. In this context, the fly height corresponds to, for example, a floating distance of the head portion from the surface of the magnetic disk. In the DFH control, a current (or alternatively a voltage) is supplied to the heater element HE provided in the slider 2, and thus a portion of the slider 2 (e.g., the heater element HE and a peripheral portion of the head portion) is heated and deformed by thermal expansion. Therefore, a portion of the slider 2 protrudes or extends toward the magnetic disk 1. In the following description, the current or the voltage supplied to the heater element HE is described as electric power supplied to the heater element HE.

An amount by which a portion of the slider 2 extends toward the magnetic disk 1 can be controlled by information, such as a signal value, corresponding to the electric power supplied to the heater element HE. A change in the amount by which a portion of the slider 2 extends toward the magnetic disk 1 corresponds to a change in the electric power supplied to the heater element HE. However, the change in the amount the portion of the slider extends is not immediate, and occurs with a delay according to a certain time constant. For this reason, the preheating process is performed, which heats the heater element HE at a point in time prior to a point in time at which the head portion passes a target position of the DFH control. The preheating process is executed as part of DFH control, and thus it is possible to obtain an appropriate fly height of the head portion at a point in time at which the head portion passes a target position for read processing or write processing. In the following description, the floating control (e.g., DFH control) will be described as including the preheating process unless otherwise specified.

Despite the use of the above-described preheating process, differences in performance of the write processing of the HDD 10 with the head portion may occur. Such differences in performance of the write processing can be due to a structural variation of the head portion, such as a difference in a core width of the head portion (in particular, a core width of the write head WH), or a difference in a machined dimension in the vicinity of the head portion, such as that caused by manufacturing variations. By adjusting a distance between the magnetic disk 1 and the slider 2 (in particular, the head portion) using the DFH control, it is possible to eliminate or otherwise reduce the head-to-head differences in the performance of the write processing due to the structural variations of different head portions.

On the surface of the magnetic disk 1, for example, a projection having a convex shape may be present. When the fly height is decreased by the DFH control below the projection height of such a convex shape, there is a possibility that the slider 2 can collide with the projection on the magnetic disk 1. Therefore, it is necessary to set the fly height to be relatively large except for a period during which write processing or read processing is actually taking place. The fly height at a start time of the write processing or the read processing is stabilized by the preheating process, and thus the performance immediately after the start of the write processing or the read processing is stabilized. Here, in consideration of possible presence of projections on the magnetic disk 1, it is preferable to avoid starting the preheating process at an earlier time than necessary. That is, optimization of the fly height that takes into consideration the structural variation of the head portion, and optimization of a start time of the preheating process are beneficial to the operation of the HDD 10.

Therefore, according to the present embodiment, the HDD 10 is configured to adjust a time related to the preheating (PH) processing. Such a PH time adjustment is described below. The write processing, the read processing, the fly height control, and the PH time adjustment are executed according to a command transmitted from the host 100, or according to an internal request within the HDD 10, and are controlled according to a program (e.g., firmware) executed by the CPU 62. Data associated with the program is stored in the nonvolatile memory 24 or the magnetic disk 1 in a nonvolatile manner.

In operation, the magnetic disk 1 is rotated by the SPM 5. Rotation of the SPM 5 is controlled by a driving voltage or a driving current from the driver IC 21. The arm 3 and the VCM 4 comprise an actuator. The slider 2 is attached to one end of the arm 3. The actuator moves the slider 2 to a target position of the magnetic disk 1. That is, the actuator moves the slider 2, which is attached to the arm 3, in a radial direction with respect to the disk 1 by driving the VCM 4. The VCM 4 is controlled by a driving voltage or a driving current from the driver IC 21.

The magnetic disk 1 has a recording surface. Data is recorded on the recording surface, and thus a data track (more simply, a track) is formed. That is, the magnetic disk 1 is configured as a recording medium having a recording surface for recording data. The recording surface of the magnetic disk 1 includes at least a servo area in which servo data for controlling a position of the slider 2 on the recording surface is recorded, a user data area for recording user data transmitted from the host 100, and a system area for recording system data for managing the user data recorded in the user data area. The recording surface of the magnetic disk 1 may have a cache area for temporarily recording user data to be recorded in the user data area.

The servo data is data which is recorded in a manufacturing process of the HDD 10 and is not modified after shipment of the HDD 10. The system data includes data to be managed in the write processing and the read processing executed in the HDD 10. The system data may be recorded in the nonvolatile memory 24 instead of the system area of the magnetic disk 1. The user data includes not only data transmitted from the host 100 to be recorded in the user data area or the cache area, but also data already recorded in the user data area or the cache area, and data read from the user data area or the cache area. Hereinafter, the user data is referred to as data.

The slider 2 includes at least the head portion including the read head RH and the write head WH, and the heater element HE. The read head RH reads the data recorded on a track of the magnetic disk 1. The data to be read includes the servo data, the user data, and the system data. The write head WH writes the user data and the system data on the magnetic disk 1. The read head RH is configured as a reading element, and the write head WH is configured as a recording or writing element. In the following description, the slider 2 may be referred to as a head or a head portion in some cases. The heater element HE generates heat according to the supplied electric power and heats a portion of the slider 2. The heated portion of the slider 2 thermally expands and protrudes/extends toward the magnetic disk 1. In some embodiments, one heater element HE is disposed between the read head RH and the write head WH. Alternatively, in some embodiments, one heater element HE is respectively disposed in the vicinity of the read head RH and in the vicinity of the write head WH. The heater element HE is formed from a resistor or a coil as an electric circuit element. In FIG. 1, a plurality of magnetic disks 1 and a plurality of sliders 2 are illustrated. The plurality of sliders 2 may each correspond to a respective one of the recording surfaces of the plurality of magnetic disks 1.

The head amplifier IC 22 includes a read amplifier (not illustrated), a write driver (not illustrated), and a heater driver HD. The read amplifier amplifies a read signal read by the read head RH, and outputs the read signal to the RWC 61. The write driver outputs a write current to the write head WH that corresponds to write data supplied from the RWC 61. The heater driver HD outputs a heater current (or a heater voltage) corresponding to heater data supplied from the CPU 62 or the HDC 63, to the heater element HE. The heater data is data indicating a value corresponding to the heater current (or the heater voltage). In the following description, the heater current or the heater voltage is simply described as heater power.

The controller 60 is configured with a one-chip integrated circuit that integrally includes at least the RWC 61, the CPU 62, and the HDC 63. The controller 60 can be configured with a semiconductor circuit such as an SoC (system on a chip), an FPGA (field programmable gate array), an ASIC (application specific integrated circuit), or an LSI. The buffer memory 23 is a volatile memory which can perform data transfer at a higher speed than that of the magnetic disk 1, and a DRAM (SDRAM) or an SRAM is applied as the buffer memory 23. The nonvolatile memory 24 is a nonvolatile recording unit, and a semiconductor memory such as a NOR flash memory or a NAND flash memory is generally included as the nonvolatile memory 24. The buffer memory 23 and the nonvolatile memory 24 may not be connected to the outside of the controller 60, and may be disposed inside the controller 60. In some embodiments, a portion of a record area of the magnetic disk 1 may be applied as the nonvolatile memory 24.

The RWC 61 includes a read channel (not illustrated) and a write channel (not illustrated). The read channel decodes the data including the servo data and the user data by processing the amplified read signal supplied from the head amplifier IC 22. The read channel in the RWC 61 executes processing related to detection and correction of an error of the user data, and generates information for evaluating the user data that has been read. The information can be transmitted to the CPU 62 according to a request from the CPU 62. The read channel includes a Viterbi decoding circuit and an LDPC decoding circuit. The write channel encodes write data that is supplied from the HDC 63 and is to be written, and outputs the encoded write data to the head amplifier IC 22.

The HDC 63 is connected to the buffer memory 23 and the nonvolatile memory 24, and controls transmission and reception of data transferred between the HDC 63 and the buffer memory 23 and between the HDC 63 and the nonvolatile memory 24. The data transferred between the HDC 63 and the buffer memory 23 includes read data and write data that are transferred to and from the host 100, and data related to the fly height control process or the PH time adjustment processing. The read data is user data which is read from the magnetic disk 1, and the write data is user data which is written to the magnetic disk 1. The data related to the fly height control includes heater data and heater sensitivity data for setting the electric power to be supplied to the heater element HE. The heater data is indicated by a value corresponding to the current, the voltage, or the electric power supplied to the heater element HE, or a value corresponding to a heating amount of the heater element HE. The heater sensitivity data is data corresponding to the heating amount of the heater element HE with respect to a change in the amount of electric power supplied to the heater element HE, or data corresponding to a change in the amount of protrusion or extension of the fly height of the slider 2 according to the thermal expansion of the peripheral portion of the heater element HE. The data transferred between the HDC 63 and the nonvolatile memory 24 includes a program executed by the CPU 62, system data, and data related to the fly height control or to the PH time adjustment. The HDC 63 is connected to the RWC 61, and processes data input from the RWC 61 or data output to the RWC 61. For example, under the control of the CPU 62, the HDC 63 provides data which is used in the PH time adjustment and is input from the RWC 61 to the CPU 62. In addition, the HDC 63 is connected to the host 100, and processes a command and user data which are transmitted from the host 100, or a command response, a status report, and user data which are output to the host 100. The processing of user data includes processing related to a write gate in the write processing, processing related to a read gate in the read processing, and processing related to a servo gate required for servo control. The HDC 63 notifies the CPU 62 of an execution request of the fly height control or the PH time adjustment according to the command which is input from the host 100. The HDC 63 is configured to include an interface circuit that controls transmission and reception of data between the HDC 63 and each of the buffer memory 23, the nonvolatile memory 24, the RWC 61, and the host 100. The HDC 63 can output the heater data to the heater driver HD. In this case, the HDC 63 may generate the heater data based on an instruction from the CPU 62, and output the generated heater data. The HDC 63 may receive the heater data from the CPU 62, and output the received heater data.

The CPU 62 is an IC which is also referred to as a microprocessor or a microcontroller. The CPU 62 executes positioning control (e.g., servo control) of the head portion (e.g., the read head RH and the write head WH) by controlling the VCM 4 via the driver IC 21. The servo control includes at least control for positioning the head portion at any position in a radial direction of the magnetic disk 1, and control for moving the head portion on the magnetic disk 1 from the current position toward the target position. In addition, the CPU 62 controls the write processing and the read processing on the magnetic disk 1 at least via the RWC 61. The CPU 62 controls the fly height control process or the PH time adjustment in parallel with the write processing and the read processing. The servo control can be executed as a part of the write processing and a part of the read processing. The CPU 62 outputs the heater data to the heater driver HD as part of the fly height control or the PH time adjustment. The CPU 62 uses the HDA and the circuit block described above according to the program executed by the CPU 62 to control various types of processing. The CPU 62 is configured as a control unit or a control circuit that controls the various types of processing.

With the configuration described above, the HDD 10 according to the present embodiment can execute the various types of processing to be described in detail below.

Figure 2:
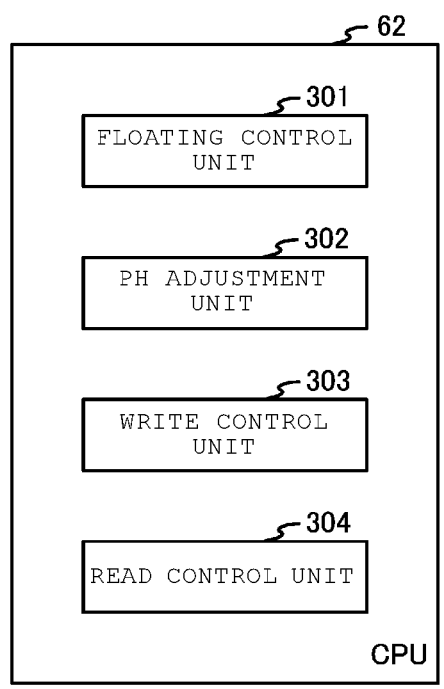
FIG. 2 is a diagram illustrating operations of a plurality of functional units which are implemented in a CPU of an HDD according to the embodiment.

Next, an operation of the CPU 62 will be described with reference to FIG. 2. FIG. 2 is a diagram illustrating operations of a plurality of functional units that are implemented in the CPU 62 of the HDD 10, according to the present embodiment.

According to the present embodiment, the CPU 62 operates according to the program, and thus the operations of the various functional units can be realized. The CPU 62 includes a fly height control unit 301, a preheating adjustment unit (hereinafter, also referred to as a PH adjustment unit) 302, a write control unit 303, and a read control unit 304. These functional units control at least the RWC 61 and the HDC 63. In addition, each functional unit included in the CPU 62 executes various types of processing in cooperation with the HDA and the circuit block provided in the HDD 10. Each functional unit of the CPU 62 is configured so as to share information and synchronize a process timing with each other. In addition, each functional unit of the CPU 62 is configured so as to execute processing in parallel.

The fly height control unit 301 controls the fly height of the slider 2 according to an execution request which is input from the HDC 63. Here, the fly height control includes the preheating process. The fly height control unit 301 controls the fly height control process in parallel with the write processing by the write control unit 303 or the read processing by the read control unit 304. The fly height control unit 301 receives data required in fly height control from the HDC 63, and outputs data to be stored as part of fly height control to the HDC 63. In addition, the fly height control unit 301 shares the data required for fly height control with the write control unit 303 and/or the read control unit 304. For example, according to an execution request related to write processing or read processing on a certain track, the fly height control unit 301 receives data for setting the fly height on the track and data indicating a start time for the fly height control process from the HDC 63. The data for setting the fly height and the data indicating the start time of the fly height control process may require correction while the fly height control process is being executed. Thus, the fly height control unit 301 outputs the corrected data to the HDC 63. The data for setting the fly height includes at least the heater data and the heater sensitivity data. The data related to the start timing of the fly height control process is data that corresponds to a time. In addition, for example, the fly height control unit 301 shares data for specifying a target track of the write processing or the read processing with the write control unit 303 or the read control unit 304.

The PH adjustment unit 302 adjusts a preheating time which is used during fly height control controlled by the fly height control unit 301. The PH adjustment unit 302 adjusts the preheating time according to the execution request which is input from the HDC 63. The preheating time is data indicating a time interval during which electric power is supplied to the heater element HE (i.e., turning on the heater) prior to a time at which the head portion passes a fly height control target position (for example, a position specified by a head, a track, and a sector), and is data related to the start time of fly height control. The PH adjustment unit 302 adjusts a preheating time for the write processing (hereinafter, also referred to as a WPH time) and a preheating time for the read processing (hereinafter, also referred to as an RPH time). The PH adjustment unit 302 may adjust at least the WPH time. The PH adjustment unit 302 adjusts the preheating time in parallel with fly height control process, the write processing, or the read processing. In the following description, adjusting the preheating time controlled by the PH adjustment unit 302 is also referred to as preheating time adjustment (PH time adjustment). Similar to the fly height control unit 301, the PH adjustment unit 302 transmits and receives data related to the PH time adjustment to and from the HDC 63. For example, the PH adjustment unit 302 receives, from the HDC 63, data required for fly height control on a target track before the start of the PH time adjustment. In the PH time adjustment, the PH adjustment unit 302 receives from the HDC 63 data related to data read from the disk 1. In addition, for example, the PH adjustment unit 302 shares data for specifying a target track for the PH time adjustment with the write control unit 303 or the read control unit 304.

The write control unit 303 controls the write processing of data on the magnetic disk 1. The write control unit 303 controls the write processing according to an execution request which is input from the HDC 63. The write control unit 303 controls the write processing in parallel with the fly height control by the fly height control unit 301 and the PH time adjustment by the PH adjustment unit 302. The write control unit 303 controls the write processing by using a shingled recording method, or by using a conventional recording method, i.e. a non-shingled recording method. The write processing via a shingled recording method is a method in which new data is recorded such that the new data partially overlaps with a part of recorded data in a previously written track (so that a part of previously written track is overwritten without data actually being lost). The write processing via an ordinary recording method is a method in which new data is recorded so that the new data does not overlap with data recorded in a previously track (so that substantially no part of recorded data is overwritten). As a part of the write processing, the servo control is executed.

The read control unit 304 controls the read processing of data on the magnetic disk 1. The read control unit 304 controls the read processing according to an execution request which is input from the HDC 63. The read control unit 304 controls the read processing in parallel with the fly height control processing by the fly height control unit 301 and the PH time adjustment by the PH adjustment unit 302. The read control unit 304 receives evaluation data, which is information for evaluating data read by the read processing, from the HDC 63. The read control unit 304 outputs the received evaluation data to the PH adjustment unit 302, according to a request from the PH adjustment unit 302. As a part of the read processing, the servo control is executed.

As described above, the various types of processing according to the present embodiment are controlled by multiple functional units, which are implemented in the CPU 62.

First Embodiment

Figure 3:
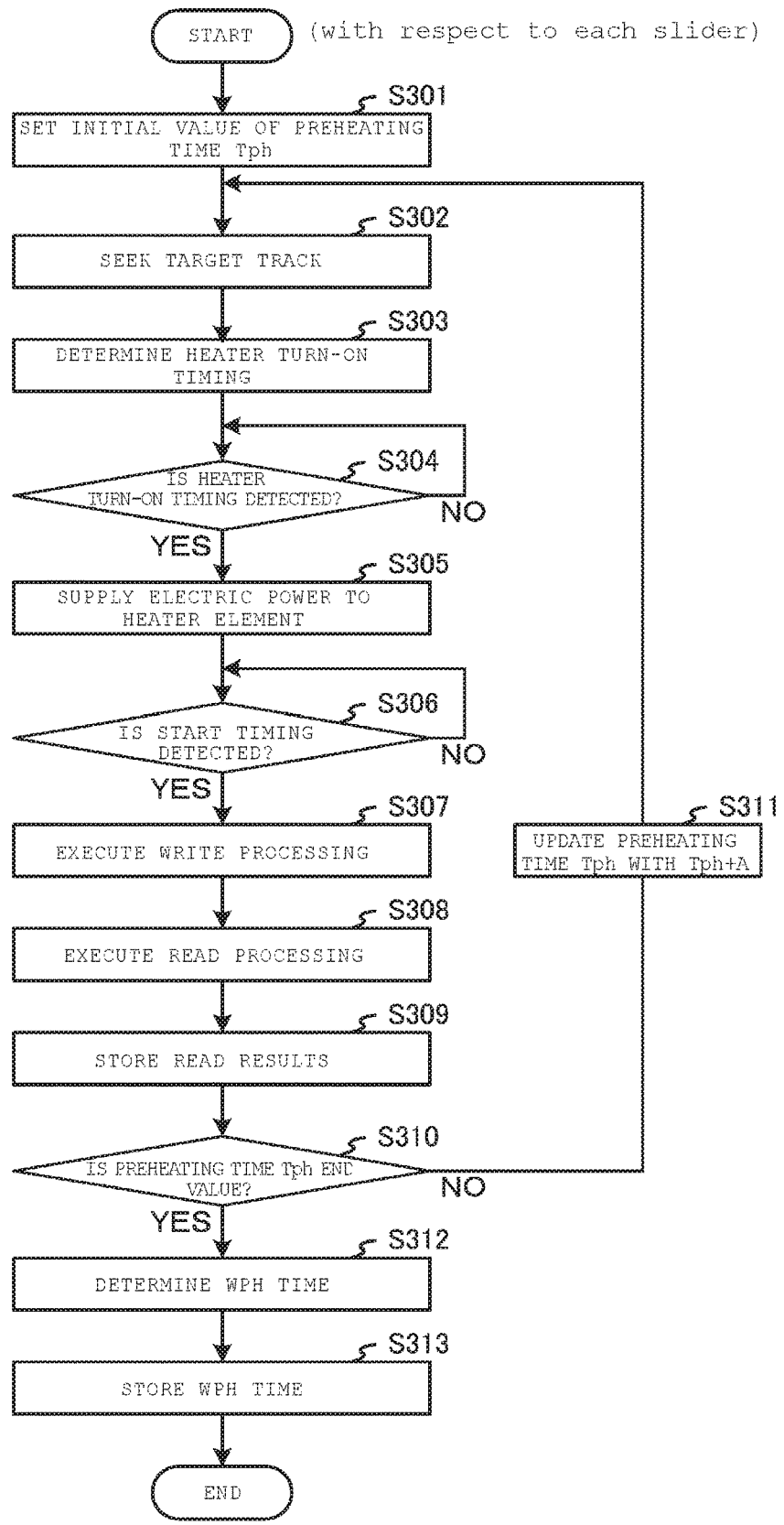
FIG. 3 is a flowchart illustrating a part of pre-heating (PH) time adjustment determination process executed by the HDD, according to a first embodiment.

Next, a part of the PH time adjustment according to a first embodiment will be described with reference to FIG. 3. FIG. 3 is a flowchart illustrating a part of the PH time adjustment determination process executed by the HDD 10, according to the first embodiment.

The flowchart of FIG. 3 illustrates operations for determining adjustment of the preheating time for the write processing. In the following description, determination of the adjustment of the preheating time is referred to as the PH time adjustment determination process for the write processing (e.g., WPH time adjustment determination process). In the determination of the preheating time adjustment, the write processing and the subsequent read processing are repeatedly executed on a target track of the processing. In addition, fly height control is executed in parallel with the write processing and the read processing. The WPH time adjustment determination process is executed in a manufacturing process of the HDD 10, according to the first embodiment. The WPH time adjustment determination process may be executed after the HDD 10 is manufactured (after shipment of the HDD 10). The processing is mainly executed by the RWC 61 and the HDC 63 under the control of the CPU 62.

When the HDC 63 receives a command from the host 100 requesting execution of the PH time adjustment determination process, the adjustment determination process is started. According to the received command, the HDC 63 notifies the CPU 62 (in particular, the PH adjustment unit 302) of the request for execution of the WPH time adjustment determination process. When receiving the execution request, the PH adjustment unit 302 receives data required for controlling the WPH time adjustment determination process, for example, from the buffer memory 23 via the HDC 63. The PH adjustment unit 302 sets an initial value of the preheating time Tph (S301). The CPU 62 (in particular, the read control unit 304) causes the slider 2 to seek a target track (and a target head) for WPH time adjustment determination (S302). The target track includes a target sector which is used for the write processing and the read processing in the WPH time adjustment determination process.

Based on the preheating time Tph (here, the initial value), the PH adjustment unit 302 determines a heater turn-on time, which is a time at which the electric power is supplied to the heater element HE (S303). The heater turn-on time is determined based on a time at which a head of the target sector included in the target track is detected. The head time corresponds to a start time of the write processing and the read processing in the WPH time adjustment determination process. The target track is set as a trajectory on a substantially concentric circle of the magnetic disk 1. Therefore, while the slider 2 is positioned on the target track, the start time is repeatedly detected according to the rotation of the magnetic disk 1. While the target track is read, the read control unit 304 can detect the start time as time information. The PH adjustment unit 302 shares the information with the write control unit 303 and the read control unit 304, and determines the heater turn-on time by subtracting the preheating time Tph from a time indicated by the time information.

While the slider 2 is positioned on the target track, the PH adjustment unit 302 determines whether or not the heater turn-on time is detected (S304). When the heater turn-on time is not detected (NO in S304), the determination is repeatedly executed. When the heater turn-on time is detected (YES in S304), the process proceeds to the next step. When the heater turn-on time is detected, the PH adjustment unit 302 supplies the electric power to the heater element HE by controlling the heater driver HD (S305). For a certain quantity of the electric power supplied, a portion of the slider 2 protrudes or extends toward the magnetic disk 1 according to a certain time constant. At this time, the PH adjustment unit 302 sets or stores predetermined heater data for the write processing in the heater driver HD.

Thereafter, the PH adjustment unit 302 determines whether or not the start time of the write processing is detected (S306). When the start time is not detected (NO in S306), the determination continues to be repeatedly executed. When the start time is detected (YES in S306), the process proceeds to the next step. That is, the start time is detected after the preheating time Tph (here, the initial value) has elapsed from the heater turn-on time. In response to the detection of the start time, the write control unit 303 executes the write processing on the target sector (S307). Here, the data to be written may be data of which the read performance can be evaluated when subsequently read.

After the write processing on the target sector, the read control unit 304 reads the data written on the target sector. In other words, the read control unit 304 executes the read processing on the target sector (S308). At this time, the PH adjustment unit 302 sets predetermined heater data for the read processing in the heater driver HD. The PH adjustment unit 302 sets the read heater data in the heater driver HD at a time sufficiently earlier than the start time of the read processing on the target sector. Specifically, A time sufficiently earlier than the start time of the read processing is a time at which a variation in the fly height of the slider 2 becomes stable prior to the start time of the read processing. The timing may be a predetermined time. The read control unit 304 receives evaluation data for evaluating data which is read from the target sector in the read processing, from the HDC 63. The data includes an error rate, the number of error bits, a result of Viterbi decoding, a result of LDPC decoding, or LLR. As a result of reading, the read control unit 304 outputs a set of data that includes the evaluation data and the preheating time Tph to the HDC 63, and the set of data is stored in, for example, the buffer memory 23 (S309).

The PH adjustment unit 302 determines whether or not the preheating time Tph which is currently set is an end value (S310). The end value of the preheating time Tph is a value sufficiently greater than the initial value. The value sufficiently greater than the initial value is a time satisfying a state where a variation in the fly height of the slider 2 becomes stable at a starting point in time of the write processing. When it is determined that the preheating time Tph is not the end value (NO in S310), the PH adjustment unit 302 updates the preheating time Tph with a value obtained by adding a fixed value A to the current preheating time Tph (S311). Thus, the preheating time Tph increases. Thereafter, the process returns to S302. The fixed value A may be a value obtained by dividing a difference value between the initial value and the end value of the preheating time Tph by a natural number of two or more. In other words, the end value is obtained by adding the fixed value A to the initial value a plurality of times. For example, in a case where the initial value is 0 μS and the end value is 2000 μS, the fixed value A=100 μS obtained by dividing the difference value 2000 μS by 20, and the end value (2000 μS) is obtained by adding the fixed value A (100 μS) to the initial value (0 μS) 20 times. In this way, processes of S302 to S311 are executed a plurality of times, and thus a plurality of read results in which the same target sector is used are obtained.

If, in step S310, it is determined that the preheating time Tph is the end value (YES in S310), the PH adjustment unit 302 acquires the plurality of read results from the HDC 63, and determines the WPH time based on the plurality of read results acquired and a first threshold value (S312). For example, the PH adjustment unit 302 selects, from the plurality of read results (i.e., the plurality of sets of data that include the evaluation data and the preheating time Tph), a plurality of preheating times Tph that each include evaluation data that exceeds the first threshold value (i.e., the evaluation data is better than the first threshold value). PH adjustment unit 302 then determines, among the plurality of selected preheating times Tph, the shortest preheating time Tph to be the WPH time. The first threshold value may be any index value that can guarantee the performance of the HDD 10 after shipment. The PH adjustment unit 302 outputs the determined WPH time to the HDC 63, and the WPH time is stored in, for example, the nonvolatile memory 24 (S313). Then, the process is ended.

As described above, in the HDD 10 according to the first embodiment, the plurality of functional units that are implemented as components of the CPU 62, mainly execute a part of the PH time adjustment determination process (e.g., WPH time adjustment determination process) by using the RWC 61 and the HDC 63. Any process of processes described in FIG. 3 may be executed with different contents. Several examples are given below. (Example 1) In the read processing, the PH adjustment unit 302 may not set the read heater data in the heater driver HD. Thus, it is possible to increase sensitivity of the result of reading. (Example 2) In a case where the initial value of the preheating time Tph is greater than the end value, when updating the preheating time Tph, the fixed value A may be subtracted. Thus, it is possible to determine the WPH time more quickly. (Example 3) The fixed value A may be variable. For example, in the vicinity of the preheating time Tph at which the evaluation data approximates the first threshold value, the fixed value A is set as a small value, and thus the resolution is increased. Therefore, it is possible to set the preheating time Tph more accurately. (Example 4) The processing of FIG. 3 may be executed by using a plurality of tracks as target tracks. For example, the target tracks may be set on each section of the inner circumference, the middle circumference, and the outer circumference of the magnetic disk 1. Thus, it is possible to correspond to a change in the optimum value of the preheating time Tph according to a skew angle of the head portion. (Example 5) The processing of FIG. 3 may be executed under a plurality of temperatures. Thus, it is possible to correspond to a change in the optimum value of the preheating time Tph according to temperatures. Further, it is possible to appropriately combine one or more of Examples 1 to Examples 5 in some embodiments.

Here, a schematic operation of a part of the PH time adjustment determination process (e.g., WPH time adjustment determination process), which is described in FIG. 3, will be described with reference to FIGS. 4A-4C. FIGS. 4A-4C are diagrams illustrating operation of a part of the PH time adjustment determination process according to the first embodiment.

In FIG. 4A, a period of duration H is a period for a particular target sector. In FIG. 4B, at each time from L to H, the electric power is supplied to the heater element HE (heater is turned on). When the electric power is supplied to the heater element HE, as illustrated in FIG. 4C, the protrusion distance of a part of the slider 2 increases according to a certain time constant, but is saturated (i.e., remains unchanged) after a predetermined time elapses. FIGS. 4A to 4C each illustrate a time elapsing from left to right, as indicated by the time axis arrow.

In the WPH time adjustment determination process, which is a part of the PH time adjustment determination process, when the heater is turned on at the initial value of the preheating time (in this example, 0), the target sector is passed during the time interval in which the protrusion distance of the slider 2 starts to change but has not reached the protrusion target value. This means that a sufficient protrusion amount on the target sector cannot be obtained at the initial value of the preheating time. That is, the evaluation data for reading data that is written when the heater is turned on at the initial value of the preheating time is expected to have a suboptimal or otherwise unsatisfactory value. Thereafter, processes of S302 to S311 of FIG. 3 are repeatedly executed, and the preheating time is increased by the fixed value A for each iteration of execution. For example, the preheating time may be obtained by repeatedly executing the processes of FIG. 3 five times. As shown in FIG. 4C, when the heater is turned on at the preheating time (5A) obtained by adding the fixed value A to the initial value of the preheating time (0) five times, the target sector is passed after the protrusion distance has reached the protrusion target value. Thus, a sufficient protrusion amount on the target sector can be obtained at the preheating time (5A). That is, the evaluation data for reading data that is written when the heater is turned on at the preheating time (5A) is expected to have a value that exceeds than a certain threshold value. After the preheating time (6A) obtained by further adding the fixed value A to the preheating time (5A), the target sector is passed at an even later time after the protrusion distance has reached the protrusion target value than when the heater is turned on at the preheating time (5A). As a result, of the evaluation data for reading the data written when the heater is turned on at a plurality of times, the evaluation data associated with the preheating times (0) to (4) have worse results than the threshold value, and the evaluation data associated with the preheating times (5) to (n) have better results than the threshold value. Among the plurality of preheating times (5) to (n) at which the evaluation data exceed the threshold value (i.e., have better results than the threshold value), the shortest preheating time (5) is determined as the WPH time.

Next, an example of a plurality of read results obtained via the PH time adjustment determination process (e.g., WPH time adjustment determination process) described in FIG. 3 will be described with reference to FIG. 5. FIG. 5 is a diagram illustrating a plurality of read results obtained via the WPH time adjustment determination process.

In FIG. 5, an X axis (depicted as the horizontal axis) indicates a preheating time, and a Y axis (depicted as the vertical axis) indicates an error rate of the evaluation data. The preheating time is 0 at an intersection point with the Y axis, and increases as a distance from the intersection point increases. That is, as a value of the preheating time increases (the preheating time becomes longer), the fly height at the start time of the write processing decreases. A value of the error rate (that is, a quality of the data which is read) improves as a distance from the intersection point with the X axis decreases, and becomes worse as a distance from the intersection point increases. Characteristic curves 1 and 2 represent two examples among the plurality of read results generated by the WPH time adjustment determination process.

As illustrated in FIG. 5, in characteristic curve 1, the value of the preheating time that intersects with the first threshold value of the error rate is PH1, and in characteristic curve 2, the value of the preheating time that intersects with the first threshold value of the error rate is PH2. The value of the preheating time PH1 is smaller than the value of the preheating time PH2. This shows that the WPH time 1 determined based on characteristic curve 1 is shorter than the WPH time 2 determined based on characteristic curve 2. Both of the characteristic curves 1 and 2 are saturated (and remain unchanged) in a region of higher preheating times and good values for the error rate. In characteristic curve 2, the value of the error rate at the preheating time PH1 indicates a value worse than the first threshold value, and in characteristic curve 1, the value of the error rate at the preheating time PH2 indicates a value better than the first threshold value.

Both of the characteristic curves 1 and 2 are results obtained by the WPH time adjustment processing using the same write heater data, and there is no difference in a thermal expansion coefficient of the slider 2 corresponding to each of characteristic curves 1 and 2. Thus, a difference in the characteristic curves is expressed as a difference in the error rate with respect to the fly height, which is caused by a variation in the structure of the slider 2 corresponding to each of characteristic curves 1 and 2. That is, this means that the slider 2 corresponding to characteristic curve 1 has better write performance than the slider 2 corresponding to characteristic curve 2 even when the fly height of the slider 2 corresponding to characteristic curve 1 is high.

The HDD 10 according to the first embodiment adjusts the preheating time for the write processing (i.e., WPH time) by executing the WPH time adjustment determination process. Therefore, it is possible to equalize the difference in the error rate sensitivity that is caused by the variation in the structure between different sliders 2. Further, the HDD 10 according to the first embodiment can avoid starting the preheating processing at an earlier time than necessary so as to avoid projections present on the magnetic disk 1. As a result, the HDD 10, according to the first embodiment, can optimize the start time of the preheating process immediately before the write processing or the read processing actually begins.

Figure 6:
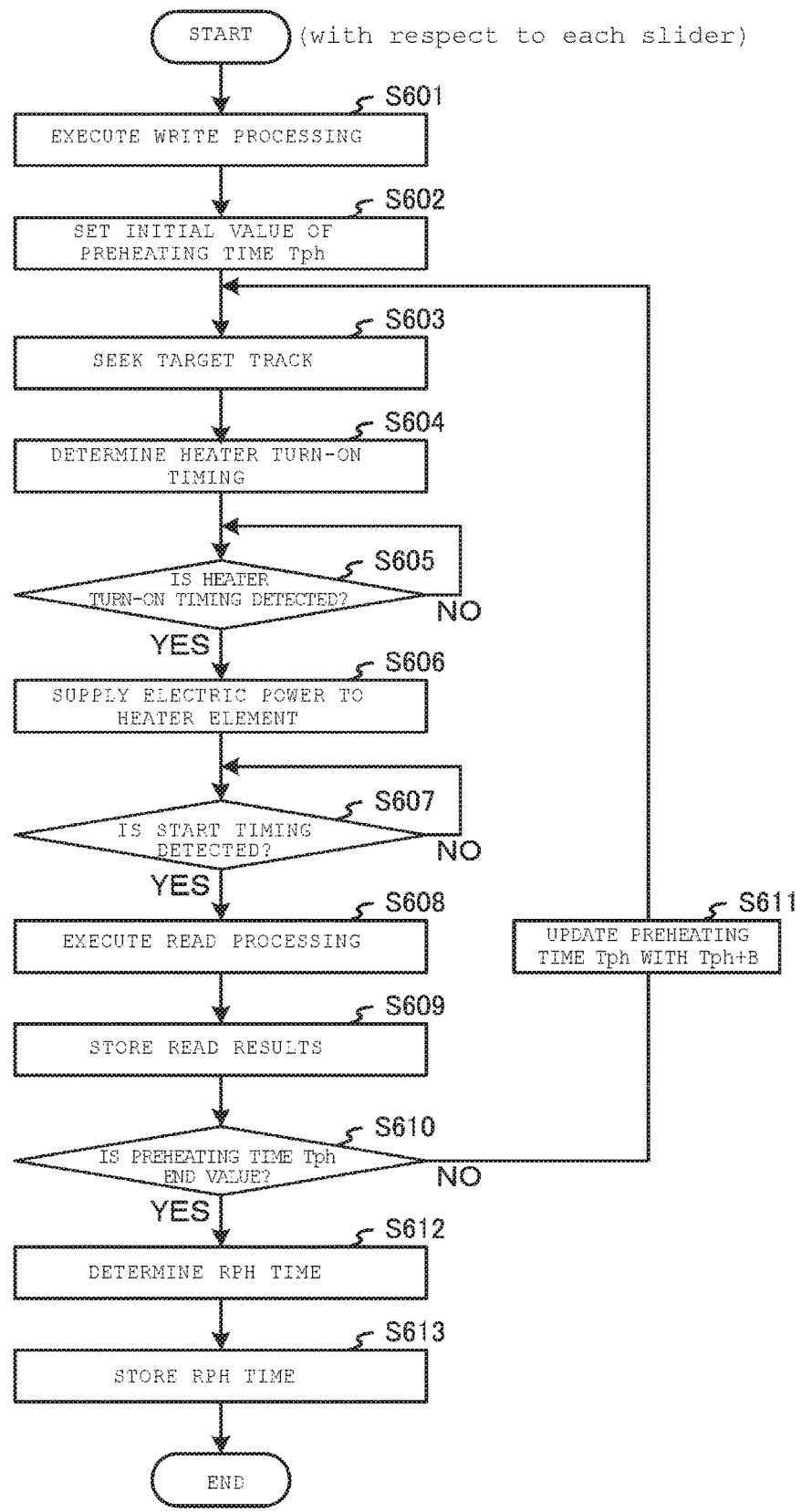
FIG. 6 is a flowchart illustrating another part of the PH time adjustment determination process executed by the HDD according to the first embodiment.

Next, another part of the PH time adjustment determination process according to the first embodiment will be described with reference to FIG. 6. FIG. 6 is a flowchart illustrating another part of the PH time adjustment determination process executed by the HDD 10 according to the first embodiment.

The flowchart of FIG. 6 illustrates operations for determining adjustment of the preheating time for the read processing (i.e., RPH time). In the following description, the processing is referred to as the PH time adjustment determination process for the read processing (referred to as RPH time adjustment determination process). In this determination process, substantially the same determination process as the WPH time adjustment determination process described in FIG. 3 is executed. However, the determination process described in conjunction with FIG. 6 is different from the determination process described in FIG. 3 in that the write processing is once executed on the target track and then the read processing is repeatedly executed. Thus, description of portions of the RPH time adjustment determination process that are substantially the same processing as the WPH time adjustment determination process, is simplified. The determination process may be also executed as part of a manufacturing process of the HDD 10 according to the first embodiment or after the HDD 10 is manufactured (for example, after shipment of the HDD 10). The determination process is primarily executed by the RWC 61 and the HDC 63 under the control of the CPU 62. In the PH time adjustment determination process, the HDD 10 according to the first embodiment executes only the WPH time adjustment determination process, both the WPH time adjustment determination process and the RPH time adjustment determination process, or only the RPH time adjustment determination process.

When receiving a command indicating an execution request for the PH time adjustment determination process from the host 100, the determination process is started in response to the received command. According to the received command, the CPU 62 (in particular, the PH adjustment unit 302) is notified of the execution request of the RPH time adjustment determination process. The PH adjustment unit 302 receives data required for controlling the RPH time adjustment determination process, for example, from the buffer memory 23 via the HDC 63.

In response to receiving the execution request for the RPH time adjustment determination process, the write control unit 303 executes the write processing on the target sector (S601). In some embodiments, the data to be written may be data for which the read performance can be evaluated when reading the data which is written. At this time, the PH adjustment unit 302 sets or stores predetermined heater data for the write processing in the heater driver HD, at a time that is sufficiently earlier than the start time of the write processing on the target sector. Specifically, a timing sufficiently earlier than the start time of the write processing is a time at which a variation in the fly height of the slider 2 becomes stable prior to the start time of the write processing. For example, the time (that is sufficiently earlier than the start time of the write processing on the target sector) may be a time sufficiently longer than the WPH time that is adjusted by the operations set forth in FIG. 3, or a predetermined time. Thereafter, the initial value of the preheating time Tph is set (S602), and the slider 2 is caused to seek the target track (and the target head) that includes the target sector for the RPH time adjustment determination process (S603).

Based on the preheating time Tph (here, the initial value), the PH adjustment unit 302 determines a heater turn-on time (S604). While the slider 2 is positioned on the target track, the PH adjustment unit 302 determines whether or not the heater turn-on time is detected, i.e., whether the heater tune-on time has transpired (S605). When the heater turn-on time is not detected (NO in S605), the determination continues to be repeatedly executed. When the heater turn-on time is detected (YES in S605), the determination process proceeds to the next step. When the heater turn-on time is detected, the PH adjustment unit 302 supplies the electric power to the heater element HE (S606). For a certain quantity of the electric power supplied, a portion of the slider 2 protrudes or extends toward the magnetic disk 1 according to a certain time constant. At this time, the PH adjustment unit 302 sets or stores predetermined heater data for the read processing in the heater driver HD.

Thereafter, the PH adjustment unit 302 determines whether or not the start time of the read processing is detected (S607). When the start time is not detected (NO in S607), the determination continues to be repeatedly executed. When the start time is detected (YES in S607), the process proceeds to the next step. In response to the detection of the start time, the read control unit 304 executes the read processing on the target sector (S608), and receives the evaluation data for evaluating the data read from the target sector, from the HDC 63. As a result of reading, the read control unit 304 stores a set of data that includes the evaluation data and the preheating time Tph, for example, in the buffer memory 23 via the HDC 63 (S609).

The PH adjustment unit 302 determines whether or not the preheating time Tph that is currently set is an end value (S610). When it is determined that the preheating time Tph is not the end value (NO in S610), the preheating time Tph is updated with a value obtained by adding a fixed value B to the current preheating time Tph (S611). The fixed value B may be the same as the fixed value A described in FIG. 3, or may be a different value from the fixed value A. Thus, by adding the fixed value B to the current preheating time Tph for each iteration, the preheating time Tph increases. Thereafter, the process returns to S603. Processes of S603 to S611 are executed a plurality of times, and thus a plurality of read results in which the same target sector is used are obtained. On the other hand, when it is determined that the preheating time Tph is the end value (YES in S610), the RPH time is determined based on the plurality of read results, which are obtained from, for example, the buffer memory 23 via the HDC 63, and a second threshold value (S612). The PH adjustment unit 302 stores the determined RPH time, for example, in the nonvolatile memory 24 (S613). Then, the process is ended.

As described above, in the HDD 10 according to the first embodiment, the plurality of functional units that are implemented as components of the CPU 62, mainly execute one part of the PH time adjustment determination process (e.g., RPH time adjustment processing) by using the RWC 61 and the HDC 63. In the RPH time adjustment determination process described in FIG. 6, any combination of the processes of Example 1 to Example 5 may be executed that are described in association with FIG. 3. In addition, in the RPH time adjustment determination process, embodiments may include any suitable combination of Examples 1 through 5.

Second Embodiment

In a second embodiment, second WPH time adjustment determination process is executed with different operations or features than those of the WPH time adjustment determination process described in the first embodiment.

The HDD 10 according to the second embodiment is different from the HDD 10 according to the first embodiment. Specifically, the CPU 62 of the HDD 10 according to the first embodiment includes the PH adjustment unit 302, and the CPU 62a of the HDD 10 according to the second embodiment includes the PH adjustment unit 302a. According to the execution request input from the HDC 63, the PH adjustment unit 302a adjusts a value of the heater data for the write processing, not the WPH time or the RPH time. In the following description, adjustment of the write heater data controlled by the PH adjustment unit 302a is referred to as write heater data adjustment (e.g., WHD adjustment). The PH adjustment unit 302a calculates the WPH time, based on the adjusted write heater data and on information on thermal expansion sensitivity of the slider 2. The information on thermal expansion sensitivity of the slider 2 is measured in prior to calculation of the WPH time and is stored in, for example, the nonvolatile memory 24. As described above, since a thermal expansion coefficient of the slider 2 is substantially the same for any sample of a particular solid, each instance of slider 2 can use the same thermal expansion coefficient. That is, the PH adjustment unit 302a can calculate the WPH time corresponding to the write heater data by using the same thermal expansion sensitivity function. In the thermal expansion sensitivity function, the write heater data and the WPH time are in inverse proportion to each other. The PH adjustment unit 302a acquires, via the HDC 63, data required for the fly height control on a particular target track, before the start of the WHD adjustment determination process. In addition, for controlling the WHD adjustment determination process, the PH adjustment unit 302a receives data indicating a quality of data that has been read from the disk 1, from the HDC 63.

Figure 7:
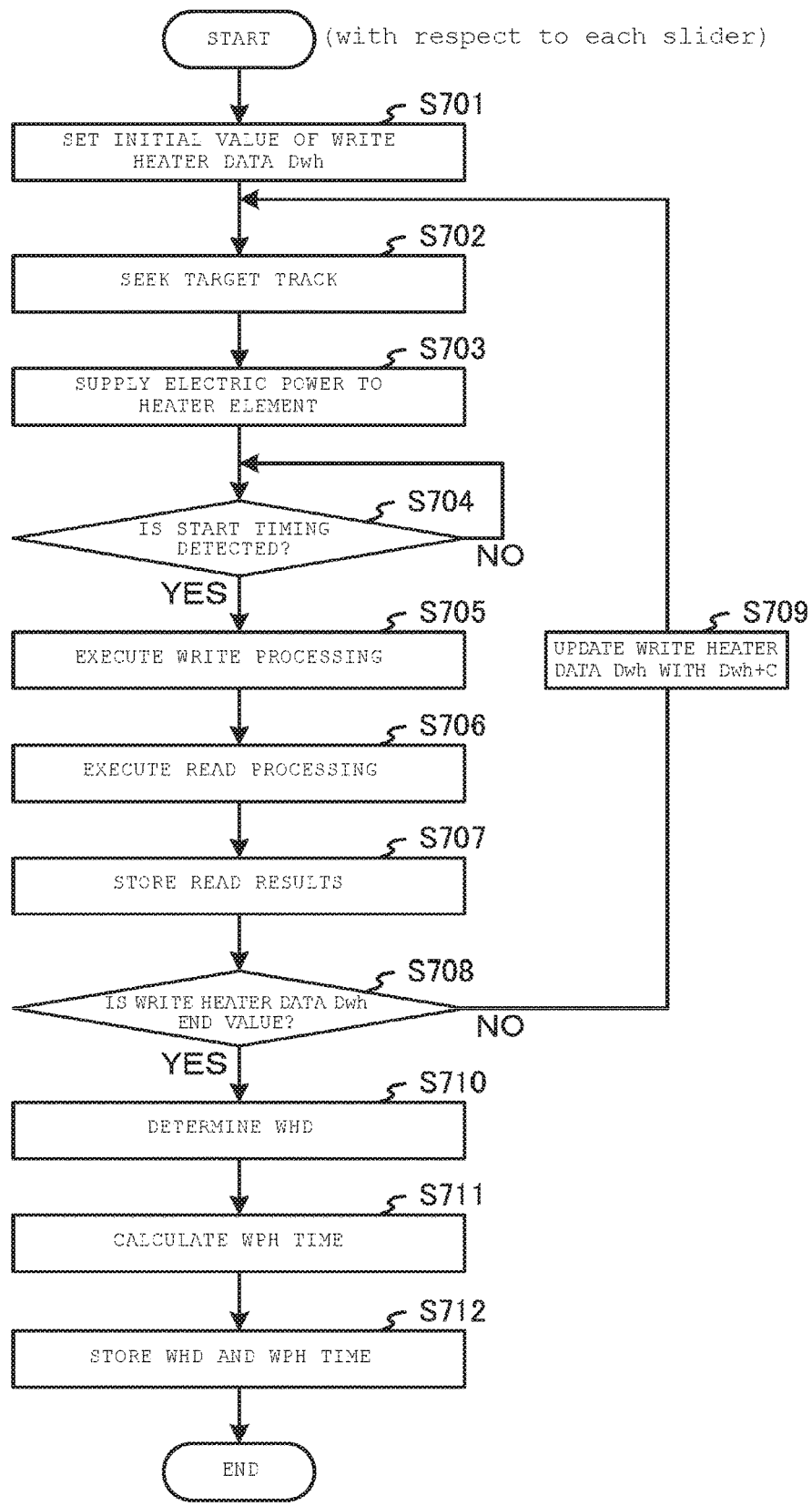
FIG. 7 is a flowchart illustrating a WHD adjustment determination process executed by the HDD, according to a second embodiment.

The WHD adjustment determination process, according to the second embodiment, will be described with reference to FIG. 7. FIG. 7 is a flowchart illustrating the WHD adjustment determination process executed by the HDD 10, according to the second embodiment.

The flowchart of FIG. 7 illustrates operations for determining adjustment of a value of heater data, such as write heater data, or WHD (i.e., a WHD adjustment determination process). In the determination process, the write processing and the subsequent read processing are repeatedly executed on a particular target track. In addition, fly height control is executed in parallel with the write processing and the read processing. In the WHD adjustment determination process, operations similar to the WPH time adjustment determination process according to the first embodiment described in FIG. 3, is executed. The flowchart of FIG. 7 is different from the flowchart of FIG. 3 in that a value of the heater data for the write processing is adjusted instead of adjusting the WPH time. Thus, description of portions of the WPH time adjustment process that are substantially similar to the WPH time adjustment determination process, is simplified. The WHD adjustment determination process may be executed as part of a manufacturing process of the HDD 10 according to the second embodiment or after the HDD 10 is manufactured (for example, after shipment of the HDD 10). The determination process is primarily executed by the RWC 61 and the HDC 63 under the control of the CPU 62a.

When the HDC 63 receives an execution request for the PH time adjustment determination process from the host 100, the determination process=is started. In response to the received command, the HDC 63 notifies the CPU 62a (in particular, the PH adjustment unit 302a) of the execution request for the WHD adjustment determination process. When receiving the execution request, the PH adjustment unit 302a also receives data required for controlling the WHD adjustment determination process, for example, from the buffer memory 23 via the HDC 63. The PH adjustment unit 302a sets an initial value of the write heater data Dwh (S701). The CPU 62a (in particular, the read control unit 304) causes the slider 2 to seek a target track (and a target head) of the WHD adjustment determination process (S702). The target track includes a target sector which is used for the write processing and the read processing in the WHD adjustment determination process.

The PH adjustment unit 302a supplies the electric power to the heater element HE (S703) by setting the write heater data Dwh (here, the initial value) in the heater driver HD at a time sufficiently earlier than the start time of the write processing. A time sufficiently earlier than the start time of the write processing is a time at which a variation in the fly height of the slider 2 becomes stable prior to the start time of the write processing on the target sector. For example, the time may be a time that is sufficiently longer than the WPH time determined by the WPH time adjustment determination process described in FIG. 3, or a predetermined time.

Thereafter, the PH adjustment unit 302a determines whether or not the start time for the target sector is detected (S704). When the start time is not detected (NO in S704), the determination continues to be repeatedly executed. When the start time is detected (YES in S704), the process proceeds to the next step. According to the detection of the start time, the write control unit 303 executes the write processing on the target sector (S705). Here, the data to be written may be data that facilitates evaluation of the read performance when read.

After the write processing on the target sector, the read control unit 304 executes read processing of the data written on the target sector (S706). At this time, the PH adjustment unit 302a sets predetermined heater data for the read processing in the heater driver HD, at a time sufficiently earlier than the start time of the read processing on the target sector. Specifically, the time sufficiently earlier than the start time of the read processing is a time at which a variation in the fly height of the slider 2 becomes stable prior to the start time of the read processing. Initially, the time may be a time sufficiently longer than the RPH time, and is adjusted by the RPH time adjustment determination process described in FIG. 6, or a predetermined time. The read control unit 304 receives evaluation data for evaluating the data which is read from the target sector in the read processing, from the HDC 63. The read control unit 304 stores a set of data that includes the write heater data Dwh and the evaluation data as a result of reading, for example, in the buffer memory 23 (S707).

The PH adjustment unit 302a determines whether or not the write heater data Dwh which is currently set is an end value (S708). When it is determined that the write heater data Dwh is not the end value (NO in S708), the write heater data Dwh is updated with a value obtained by adding a fixed value C to the current write heater data Dwh (S709). Thus, by adding the fixed value C to the current write heater data Dwh for each iteration, the write heater data Dwh increases. Thereafter, the process returns to the processing of S702.

Processes of S702 to S709 are executed a plurality of times. That is, additional iterations of S702 to S709 are executed as long as the write heater data is not determined to be the end value. Thus a plurality of read results in which the same target sector is used are obtained. On the other hand, when it is determined that the write heater data Dwh is the end value (YES in S708), the PH adjustment unit 302a determines the write heater data WHD based on the plurality of read results, which are obtained from, for example, the buffer memory 23, and a third threshold value (S710). The PH adjustment unit 302a calculates the WPH time based on the determined write heater data WHD, and on information indicating thermal expansion sensitivity of the slider 2 that is measured prior to the WHD adjustment determination process. Such information indicating thermal expansion sensitivity of the slider 2 is acquired from, for example, the nonvolatile memory 24 (S711). The determined write heater data WHD and the calculated WPH time are stored in, for example, the nonvolatile memory 24 (S712). Then, the process is ended.

As described above, according to the second embodiment, in the HDD 10 the plurality of functional units that are implemented as component of the CPU 62a primarily execute WHD adjustment processing by using the RWC 61 and the HDC 63. In some embodiments, the processes described in conjunction with FIG. 7 may be executed in conjunction with the embodiments described in Example 1 through Example 5, which are described in association with the description of FIG. 3. In addition, in the WHD adjustment determination process, embodiments may include any suitable combination of Examples 1 through 5.

Figure 8:
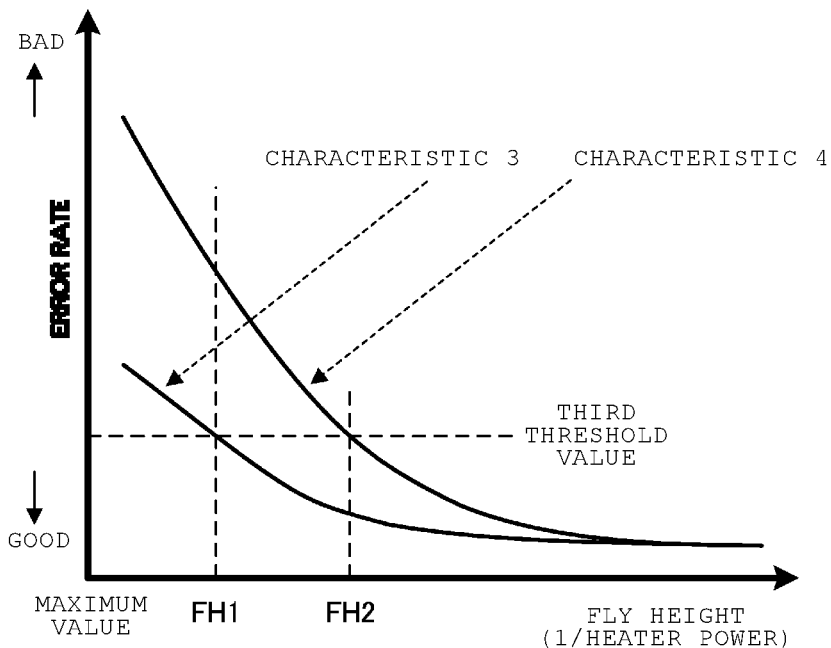
FIG. 8 is a diagram illustrating a plurality of read results obtained by the WHD adjustment determination process.

Next, an example of the plurality of read results obtained by operations or features of the PH time adjustment determination process described in FIG. 7 will be described with reference to FIG. 8. FIG. 8 is a diagram illustrating the plurality of read results obtained by the WHD adjustment determination process.

In FIG. 8, an X axis (depicted as the horizontal axis) indicates a fly height, and a Y axis (depicted as the vertical axis) indicates an error rate associated with the evaluation data. Since the fly height is inversely proportional to the write heater data and the heater power, it is considerable that the X axis may also indicate as 1/heater power. The fly height (1/heater power) has a maximum value at an intersection point with the Y axis, and decreases as a distance from the intersection point increases. Thus, in FIG. 8, the maximum value of the fly height is denoted "maximum value". So the fly height becomes the "maximum value" when heater power=0. In other words, as a value of the fly height (1/heater power) decreases and as the heater power increases (i.e., moves to the right along the X axis in FIG. 8), a distance between the magnetic disk 1 and the slider 2 decreases. In addition, an error rate value decreases (that is, a quality of the data that is read increases) as a distance from the intersection point with the X axis decreases, and increases (that is, the quality of the data that is read decreases) as a distance from the intersection point with the X axis increases. Characteristic curves 3 and 4 represent two examples among the plurality of read results in the WHD adjustment processing.

As illustrated in FIG. 8, in characteristic curve 3, the value of the fly height that intersects with the third threshold value of the error rate is FH1, and in characteristic curve 4, the value of the fly height that intersects with the third threshold value of the error rate is FH2. That is, the fly height FH1 is greater than the fly height FH2. This indicates that an amount of the write heater data WHD1 corresponding to the heater power determined based on characteristic curve 3 is smaller than an amount of the write heater data WHD2 corresponding to the heater power determined based on characteristic curve 4. The fly height FH1 is obtained based on the write heater data WHD1, and the fly height FH2 is obtained based on the write heater data WHD2. Both of characteristic curves 3 and 4 are saturated (i.e., remain unchanged) in a region of decreased fly height, where the values of the error rate are good. In characteristic curve 4, the value of the error rate corresponding to the write heater data WHD1 indicates a value worse than the third threshold value, and in characteristic curve 3, the value of the error rate at the write heater data WHD2 indicates a value better than the third threshold value.

Both of characteristic curves 3 and 4 are results measured by using values of the same write heater data, and there is no difference in a thermal expansion coefficient of the slider 2 corresponding to each of characteristic curves 3 and 4. Thus, a difference in the characteristics is expressed as a difference in the error rate with respect to the fly height, which is caused by a variation in the structure of the slider 2 corresponding to each of characteristic curves 3 and 4. That is, this means that the slider 2 corresponding to characteristic curve 3 has better write performance than the slider 2 corresponding to characteristic curve 4, even in situations where the fly height is higher than the fly height of the slider 2 corresponding to characteristic curve 4.

From this result, the PH adjustment unit 302a calculates the WPH time 1 for the slider 2 corresponding to characteristic curve 3 based on the write heater data WHD1, and calculates the WPH time 2 for the slider 2 corresponding to characteristic curve 4 based on the write heater data WHD2. The value of the write heater data WHD1 is smaller than the value of the write heater data WHD2. By contrast, the WPH time 1 is calculated to be a value greater than a value of the WPH time 2.

The HDD 10 according to the second embodiment adjusts the write heater data for the write processing and the preheating time for the write processing (i.e., WPH time) by executing the WHD adjustment determination process. Therefore, it is possible to equalize the difference in the error rate sensitivity that is caused by the variation in the structure of the slider 2. Further, the HDD 10 according to the second embodiment can avoid start the preheating process at an earlier timing than necessary so as to avoid projections present on the magnetic disk 1. In addition, the HDD 10 according to the second embodiment can optimize the write heater data (that is, write heater power) in the write processing, for each slider 2. As a result, the HDD 10 according to the second embodiment can optimize the start time of the preheating process immediately before the write processing or the read processing actually begins.

As described above, in the HDD 10 according to the second embodiment, the plurality of functional units that are implemented as components of the CPU 62a, primarily execute parts of the PH time adjustment determination process (e.g., WHD adjustment determination process) by using the RWC 61 and the HDC 63. In the WHD adjustment determination process described in FIG. 7, any combination of the processes of Examples 1 through 5 that are described in association with description of FIG. 3 can also be executed. In addition, in the WHD adjustment determination process, embodiments may include any suitable combination of Examples 1 through 5.

Third Embodiment

In a third embodiment, a third WPH time adjustment determination process is executed with different operations or features than those of the WPH time adjustment determination process described in the first embodiment and the second WPH time determination adjustment process described in the second embodiment.

The HDD 10 according to the third embodiment is different from the HDD 10 according to the first embodiment in that the HDD 10 according to the first embodiment includes the CPU 62, whereas the HDD 10 according to the third embodiment includes the CPU 62b. The CPU 62b includes the floating control unit 301, the PH adjustment unit 302b, the write control unit 303, the read control unit 304, and a head characteristic measurement unit 310. The floating control unit 301, the write control unit 303, and the read control unit 304 operate the same as corresponding functional units described in the first embodiment, and thus a description thereof will be omitted. Each functional unit provided in the CPU 62b according to the third embodiment executes various operations in cooperation with the HDA and the circuit block provided in the HDD 10. Each functional unit of the CPU 62b is configured so as to share information and synchronize processing with each other. In addition, each functional unit of the CPU 62b is configured so as to execute processing in parallel with each other when appropriate.

The PH adjustment unit 302b determines the WPH time based on characteristic information associated with a characteristic of the head that is measured by the head characteristic measurement unit 310. In some embodiments, the characteristic information is a core width of the write head WH provided in the slider 2. The PH adjustment unit 302b determines the WPH time based on a relationship between the characteristic information and the WPH time that is stored in prior to the WPH time adjustment determination process, for example, in the nonvolatile memory 24.

The head characteristic measurement unit 310 measures the core width of the write head WH. The measurement is performed for each write head WH, for example, in a manufacturing process of the HDD 10 or of the slider 2. In addition, any suitable measurement method can be employed to measure the head characteristic information. For example, the head characteristic measurement unit 310 causes the write control unit 303 to write evaluation data for evaluating the read performance of the data by using the write head WH for which the head characteristic information is being measured. Such evaluation data is written on a track to be measured. Thereafter, the head characteristic measurement unit 310 causes the read control unit 304 to read the evaluation data which is written on the track to be measured. In general, the core width of the write head WH is sufficiently larger than a core width of the read head RH, that a width of the data written on the magnetic disk 1 is wider than the core width of the write head WH by a predetermined amount in the radial direction (i.e., perpendicular to track direction). Thus, the read control unit 304 executes a so-called "shift reading" operation on the evaluation data written on the track to be measured, and measures the error rate in each shift reading operation. The shift reading operation is an operation of shifting the read head RH on a certain track by a small amount in the radial direction (i.e., perpendicular to track direction) and reading data written on the track a plurality of times in this way. The small amount may be, for example, approximately half the core width of the read head RH. As a result of the shift reading operation and the error rate measurement, a relationship between the shift interval and the error rate is measured. Based on the measured relationship, the head characteristic measurement unit 310 obtains a range of values of the shift interval (e.g., in the radial direction) within which the error rate is better than a certain threshold value. The head characteristic measurement unit 310 stores the core width of the write head WH as characteristic information, as obtained from the range of the shift interval.

Figure 9:
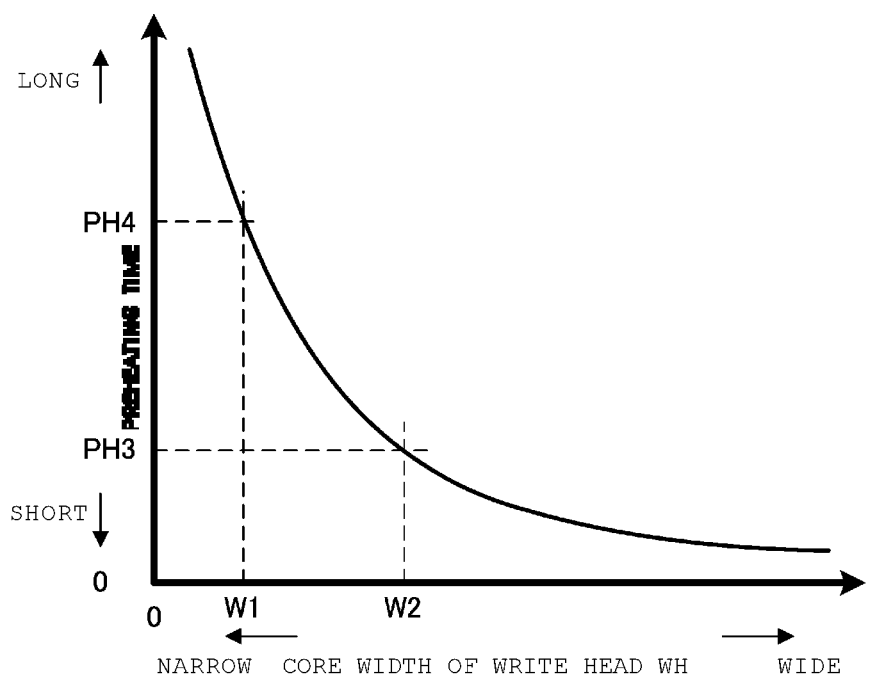
FIG. 9 is a diagram illustrating an example of a relationship between a core width of a write head and a WPH time.

The correspondence relationship between the core width of the write head WH and the WPH time is now described with reference to FIG. 9. FIG. 9 is a diagram illustrating an example of the relationship between the core width of the write head WH and the WPH time.

In FIG. 9, an X axis (depicted as the horizontal axis) indicates the core width of the write head WH as the characteristic information, and a Y axis (depicted as the vertical axis) indicates the preheating time (here, the WPH time). The core width of the write head WH is 0 at an intersection point with the Y axis, and increases (becomes wider) as a distance from the intersection point increases. The preheating time is 0 at an intersection point with the X axis, and increases (becomes longer) as a distance from the intersection point increases. The value of the WPH time is in inverse proportion to the core width of the write head WH. For example, as a result of measurement by the head characteristic measurement unit 310, when the core width of the write head WH is measured to be core width WH1, PH4 is determined to be the preheating time (e.g., WPH time), and when the core width of the write head WH is measured to be core width WH2, PH3 is determined to be the preheating time (e.g., WPH time). That is, as the core width becomes narrower, the value of the preheating time is determined to be larger (i.e., a longer time interval).

The correspondence relationship is measured, for example, prior to a manufacturing process of the HDD 10, and is stored in, for example, the nonvolatile memory 24 in a nonvolatile manner, in ae manufacturing process of the HDD 10. For example, the correspondence relationship is measured in advance using a plurality of HDDs 10 before the manufacturing process of the HDD 10. At this time, the core width of the write head WH may be measured and the preheating time (e.g., WPH time) may be measured via the WPH time adjustment determination process described in the first embodiment or the second WPH time adjustment determination process described in the second embodiment. In addition, the measurement results of the plurality of HDDs 10 may be averaged.

As described above, according to the third embodiment, the plurality of functional units that are implemented in the HDD 10 as components of the CPU 62b determine the preheating time (e.g., WPH time) by using the RWC 61 and the HDC 63. The HDD 10 according to the third embodiment determines the preheating time for the write processing (e.g., WPH time) by measuring the core width of the write head WH. Therefore, it is possible to equalize the difference in the error rate sensitivity for different instances of the slider 2 that is caused by the variation in the structure of the different instances of slider 2 (in particular, the core width of the write head WH). Further, the HDD 10 according to the third embodiment can avoid starting the preheating process at an earlier time than necessary so as to avoid projections present on the magnetic disk 1. As a result, the HDD 10 according to the third embodiment can optimize the start time of the preheating process immediately before the write processing or the read processing actually begins.

While certain embodiments have been described, these embodiments have been presented by way of example only, and are not intended to limit the scope of the inventions. Indeed, the novel embodiments described herein may be implemented in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A disk device comprising:
   a first recording surface and a second recording surface, each disposed on any one of one or more disks;
   a first head for the first recording surface, the first head including a first heater which generates heat via a first electric power;
   a second head for the second recording surface, the second heater including a second heater which generates heat via a second electric power; and
   a control circuit configured to execute a first preheating operation in which the first electric power is supplied to the first heater for a first time interval prior to starting a first writing process in which data are written on the first recording surface by the first head, and to execute a second preheating operation in which the second electric power is supplied to the second heater for a second time interval prior to starting a second writing process in which data are written on the second recording surface by the second head,
   wherein the first time interval is different from the second time interval.

2. The disk device according to claim 1,
   wherein a duration of the first time interval is based on a first instruction value, a duration of the second time interval is based on a second instruction value, and the first instruction value and the second instruction value are different values from each other.

3. The disk device according to claim 2, wherein the first instruction value is based on the first electric power and on first heating sensitivity data associated with the first heater and the second instruction value is based on the second electric power and on second heating sensitivity data associated with the second heater.

4. The disk device according to claim 1,
   wherein the control circuit is configured to execute a third preheating operation in which a third electric power is supplied to the first heater for a third time interval prior to starting a first reading process in which data are read from the first recording surface by the first head, and to execute a fourth preheating operation in which a fourth electric power is supplied to the second heater for a fourth time interval prior to starting a second reading process in which data are read from the second recording surface by the second head,
   wherein the third time interval is different from the fourth time interval.

5. The disk device according to claim 4, wherein the duration of the third time interval is based on evaluation data that includes information for evaluating first data read by the first head, and the duration of the fourth time interval is based on evaluation data that includes information for evaluating second data read by the second head.

6. The disk device according to claim 5, wherein the first data read by the first head includes data written by the first head via multiple different writing processes that each include a different preheating operation and the second data read by the second head includes data written by the second head via multiple different writing processes that each include a different preheating operation.

7. The disk device according to claim 6, wherein each of the multiple different preheating operations by which the first head writes the first data includes supplying the first electric power to the first heater for a different time interval prior to starting to write the first data, and each of the multiple different preheating operations by which the second head writes the second data includes supplying the second electric power to the second heater for a different time interval prior to starting to write the second data.

8. The disk device according to claim 4,
   wherein a duration of the third time interval is based on a third instruction value, a duration of the fourth time interval is based on a fourth instruction value, and the first instruction value and the second instruction value are different values from each other.

9. The disk device according to claim 4,
   wherein the first heater includes a first write heater that is used in the first writing process and a first read heater that is used in the first reading process, and
   wherein the second heater includes a second write heater that is used in the second writing process and a second read heater that is used in the second reading process.

10. The disk device according to claim 1,
    wherein the first time interval is longer than the second time interval, and a first core width of a first write element that is included in the first head and is used in the first writing process is narrower than a second core width of a second write element that is included in the second head and is used in the second writing process.

11. A control method of a disk device,
    the disk device including
    a first recording surface and a second recording surface disposed on any one of at least one or more disks,
    a first head that corresponds to the first recording surface and includes a first heater which generates heat by first electric power, and
    a second head that corresponds to the second recording surface and includes a second heater which generates heat by second electric power,
    the control method comprising:
    executing a first preheating operation in which the first electric power is supplied to the first heater for a first time interval prior to starting a first writing process in which data are written on the first recording surface by the first head; and
    executing a second preheating operation in which the second electric power is supplied to the second heater for a second time interval prior to starting a second writing process in which data are written on the second recording surface by the second head,
    wherein the first time interval is different from the second time interval.

12. The method according to claim 11,
    wherein a duration of the first time interval is based on a first instruction value, a duration of the second time interval is based on a second instruction value, and the first instruction value and the second instruction value are different values from each other.

13. The method according to claim 12, wherein the first instruction value is based on the first electric power and on first heating sensitivity data associated with the first heater and the second instruction value is based on the second electric power and on second heating sensitivity data associated with the second heater.

14. The method according to claim 11, further comprising:
executing a third preheating operation in which a third electric power is supplied to the first heater for a third time interval prior to starting a first reading process in which data are read from the first recording surface by the first head, and
executing a fourth preheating operation in which a fourth electric power is supplied to the second heater for a fourth time interval prior to starting a second reading process in which data are read from the second recording surface by the second head,
wherein the third time interval is different from the fourth time interval.

15. The method according to claim 14, wherein the duration of the third time interval is based on evaluation data that includes information for evaluating first data read by the first head, and the duration of the fourth time interval is based on evaluation data that includes information for evaluating second data read by the second head.

16. The method according to claim 15, wherein the first data read by the first head includes data written by the first head via multiple different writing processes that each include a different preheating operation and the second data read by the second head includes data written by the second head via multiple different writing processes that each include a different preheating operation.

17. The method according to claim 16, wherein each of the multiple different preheating operations by which the first head writes the first data includes supplying the first electric power to the first heater for a different time interval prior to starting to write the first data, and each of the multiple different preheating operations by which the second head writes the second data includes supplying the second electric power to the second heater for a different time interval prior to starting to write the second data.

18. The method according to claim 14,
wherein a duration of the third time interval is based on a third instruction value, a duration of the fourth time interval is based on a fourth instruction value, and the first instruction value and the second instruction value are different values from each other.

19. The method according to claim 14,
wherein the first heater includes a first write heater that is used in the first writing process and a first read heater that is used in the first reading process, and
wherein the second heater includes a second write heater that is used in the second writing process and a second read heater that is used in the second reading process.

20. The method according to claim 11,
wherein the first time interval is longer than the second time interval, and a first core width of a first write element that is included in the first head and is used in the first writing process is narrower than a second core width of a second write element that is included in the second head and is used in the second writing process.

* * * * *